United States Patent [19]
Karmas

[11] 3,903,292
[45] Sept. 2, 1975

[54] METHOD OF SUPPRESSING REPRODUCTION WITH SUBSTITUTED CYCLIC CARBOXYLIC ACIDS AND ESTERS

[75] Inventor: George Karmas, Bound Brook, N.J.

[73] Assignee: Ortho Pharmaceutical Corporation, Raritan, N.J.

[22] Filed: July 20, 1973

[21] Appl. No.: 381,204

Related U.S. Application Data

[63] Continuation-in-part of Ser. No. 96,651, Dec. 9, 1970, abandoned, which is a continuation-in-part of Ser. No. 723,614, April 23, 1968, abandoned.

[52] U.S. Cl. ............... 424/283; 424/305; 424/308; 424/311; 424/312; 424/317
[51] Int. Cl. ..................... A01n 9/28; A61k 27/00
[58] Field of Search .......... 424/283, 305, 308, 311, 424/312, 317

[56] References Cited
UNITED STATES PATENTS

| | | | |
|---|---|---|---|
| 3,454,577 | 7/1969 | Lehr et al. | 424/283 X |
| 3,454,601 | 7/1969 | Fried | 424/283 X |

*Primary Examiner*—Albert T. Meyers
*Assistant Examiner*—Dale R. Ore
*Attorney, Agent, or Firm*—Benjamin F. Lambert

[57] ABSTRACT

Phenyl-cyclohexenecarboxylic acids having a substituent on the phenyl ring and their alkali metal salts are described. The phenyl-cyclohexenecarboxylic acids are useful in the suppression of reproduction.

13 Claims, No Drawings

METHOD OF SUPPRESSING REPRODUCTION WITH SUBSTITUTED CYCLIC CARBOXYLIC ACIDS AND ESTERS

This application is a continuation-in-part of application Ser. No. 96,651 filed Dec. 9, 1970, which in turn is a continuation-in-part of application Ser. No. 723,614 filed Apr. 23, 1968, and both are now abandoned.

The present invention relates to phenylcyclohexenecarboxylic acids and to their preparation. More particularly, the invention relates to phenylcyclohexenecarboxylic acids which are substituted on the phenyl ring and to their alkali-metal salts.

The compounds of the invention have the following formulae:

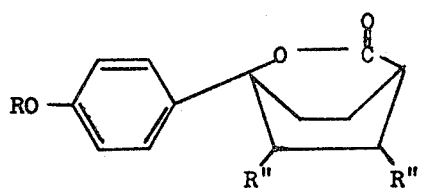

1

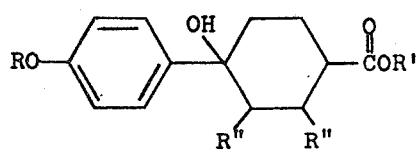

2

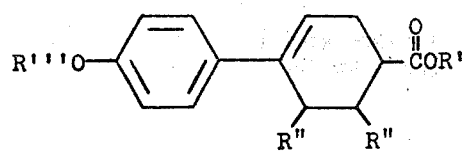

3

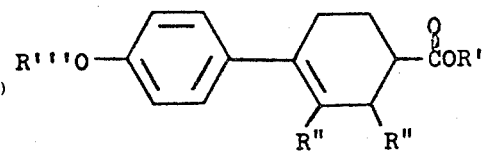

4 wherein R is hydrogen, lower acyl of from two to nine carbon atoms or tetrahydropyranyl, R' is hydrogen or lower alkyl of from one to eight carbon atoms, R'' is lower alkyl of from one to eight carbon atoms, and R''' is hydrogen or lower acyl of from two to nine carbon atoms.

The compounds of formula 1 are intermediates in the preparation of the compounds of formulae 2, 3, and 4. The compounds of formulae 2, 3, and 4 are useful as antilittering agents and as agents for the suppression of reproduction when given postcoitally. In particular, it has been found that the compounds of formulae 2, 3, and 4 possess antilittering activity at a low dose level when administered orally.

U.S. Pat. No. 2,582,253 teaches a method of preparing 2-methyl-3-ethyl-4-(p-anisyl)-3-and 4-cyclohexene-carboxylic acids. The synthetic route followed by the patent has been found to be unsatisfactory for the preparation of the compounds of formulae 3 and 4.

The novel compounds of this invention are prepared according to the following reaction scheme:

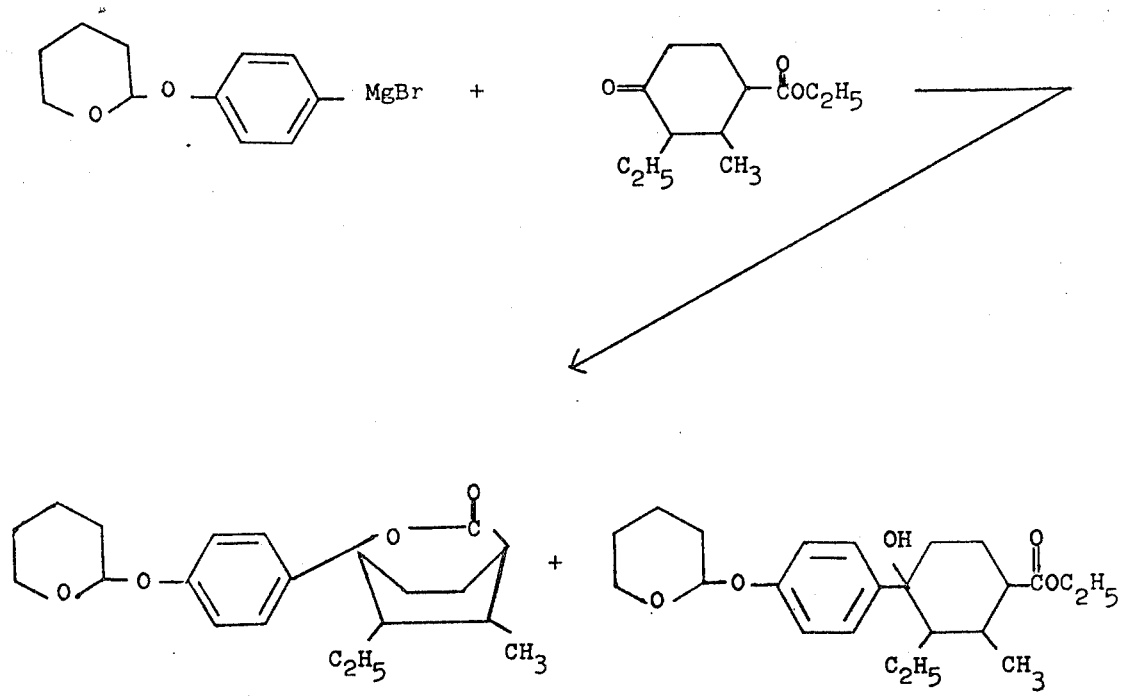

I.

The lactone of formula I exists in four forms. The form arbitrarily designated the C-lactone is further reacted as follows:

hydration of this compound, by-products are formed which are virtually irremovable if impurities are present. The dehydration of the compound of formula III is carried out as follows:

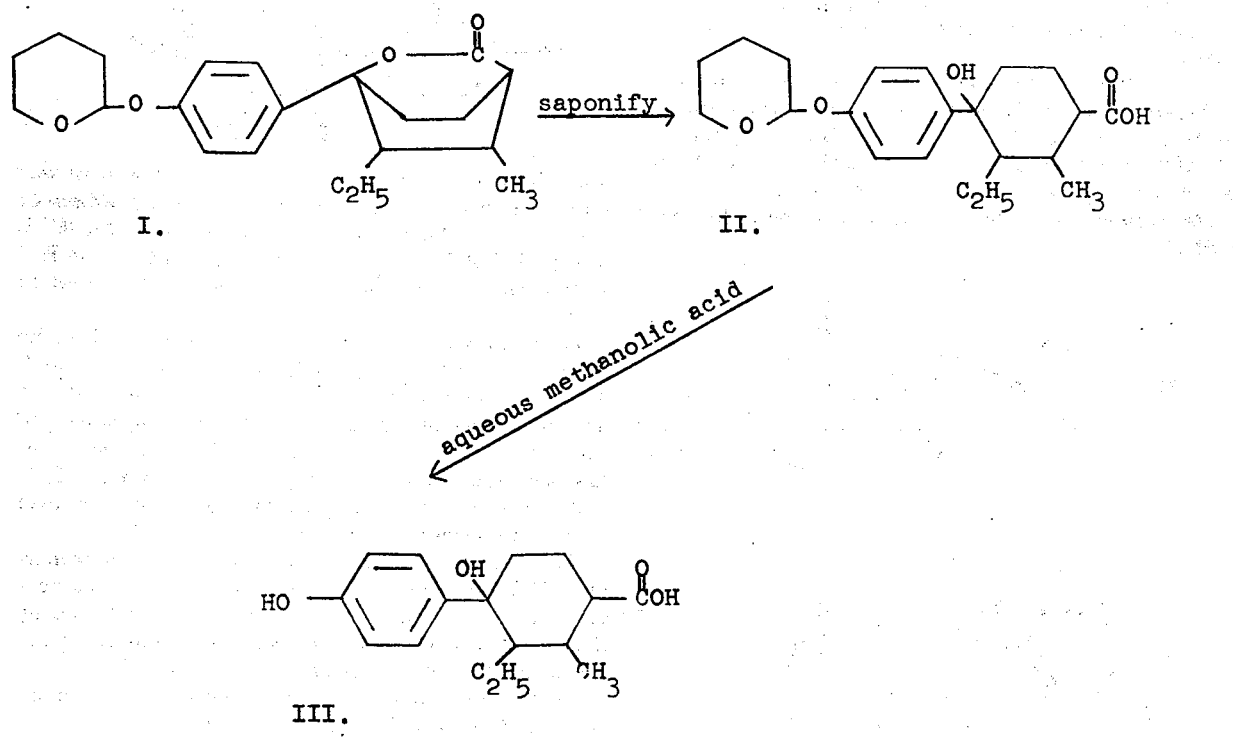

It is of utmost importance that the compound of formula III be obtained in a purified form, since upon de-

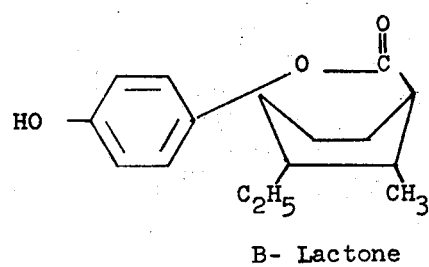

B- Lactone

The Δ³-isomer of the compound of formula IV is obtained as follows:

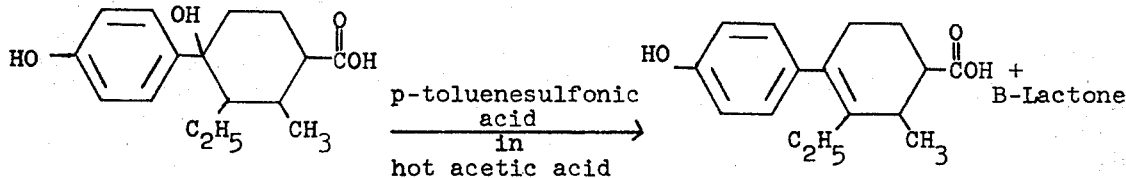

III.                                                                    V.

Compounds of formulae IV and V are also obtained by the dehydration of compounds of the formula:

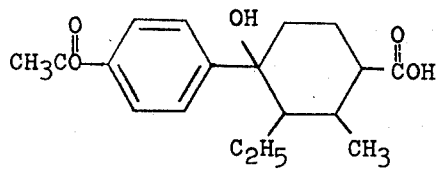

followed by hydrolysis to the free phenols with hot aqueous potassium bicarbonate.

The following examples illustrate the invention and are not to be construed as imposing any limitations thereon.

EXAMPLE I

C-Lactone of 2-Methyl-3-ethyl-4-hydroxy-4-(p-tetrahydropyranyloxyphenyl)cyclohexanecarboxylic Acid The Grignard reagent is prepared from 75 g. of p-bromophenol tetrahydropyranyl ether (described in J.A.C.S., 70, 4187–4189 (1948), and 16 g. of magnesium turnings in 300 ml. of ether plus 300 ml. of tetrahydrofuran. The resulting solution is stirred vigorously at a temperature of −40°C., while a solution of 58 ethyl of ether 2-methyl-3-ethyl-4-ketocyclohexanecarboxylate in 90 ml. of ether is added over a period of 20 minutes. The reaction mixture is warmed to 25°C. and is maintained at this temperature for 18 hours, and finally it is boiled under reflux for 20 minutes. Hydrolysis is performed by adding 500 ml. of saturated aqueous ammonium acetate at −15°C., after which the organic phase is diluted with 400 ml. of ether, and the entire mixture is filtered to remove magnesium particles. The organic phase is separated and washed with a further 100 ml. of ammonium acetate solution, with water, and then with 300 ml. of 10% aqueous potassium carbonate. After drying with anhydrous magnesium sulfate, the solution of reaction products is concentrated under vacuum and the residual oil is heated over a period of one hour to a temperature of 140°C. under 0.02 mm. of pressure in order to remove volatile materials such as unreacted ketoester, phenol tetrahydropyranyl ether, and other by-products. The glassy residue which is not volatile at 140°/0.02 mm. and weighs 61 g. is a complex mixture of lactones and hydroxyesters.

Ten grams of the non-volatile reaction product is developed onto a chromatographic column of neutral alumina. Elution with benzene and benzene-ether mixtures affords a total of 3–4 g. of oily mixed lactones, as characterized by infrared spectra showing no hydroxyl absorption and with carbonyl absorption at 5.6 to 5.8μ. Crystallization is induced in one or more of the eluate residues and seed crystals are removed. All of the eluates are combined and recrystallized from hexane containing a small amount of ether to afford a total of 1.5 g. of the C-lactone of 2-methyl-3-ethyl-4-hydroxy-4(p-tetrahydropyranyloxyphenyl)-cyclohexanecarboxylic acid as white prisms. The melting point range is 95°–115°C. with only insignificant spectral differences between the various crops. The designation, C-lactone, is applied to distinguish this product from three other theoretically possible isomers which may result from configurational variations of the methyl and ethyl groups.

Anal: Calcd. for $C_{21}H_{28}O_4$: C, 73.22; H, 8.19. Found: C, 73.46; H, 8.14.

λλmax. (KBr): 5.70, 7.84, 7.97, 8.46, 8.98, 9.87, 10.32, 10.76, 11.40, 11.85μ.

EXAMPLE II

2-Methyl-3-ethyl-4-hydroxy-4-(p-tetrahydropyranyloxyphenyl)cyclohexanecarboxylic Acid A mixture of 50 g. of the non-volatile reaction product obtained in Example I, 30 g. of sodium hydroxide, 500 ml. of methanol and 170 ml. of water is stirred and boiled under reflux for 2 hours. After dilution with 400 ml. of water, the saponification mixture is evaporated under vacuum to a volume of 400 ml. to remove methanol. A viscous oil of non-saponifiable material (7.8 g.) is removed from the alkaline concentrate by extraction with ether, and to the aqueous phase is added 250 ml. of methylene dichloride. This two-phase system is stirred and maintained at 0°C. while cold 5% hydrochloric acid is added until the aqueous phase displays an acidic reaction to test paper. The layers are separated and the aqueous phase is further extracted with two small portions of methylene dichloride. The combined methylene dichloride solutions are rapidly washed twice with 10% aqueous sodium chloride, dried with anhydrous magnesium sulfate and immediately filtered to remove drying agent. Concentration of the methylene dichloride solution under vacuum affords a residue of crystalline solid plus viscous oil. Trituration with 100 ml. of methylene dichloride and filtration provides 12 g. of crystalline hydroxyacid. Concentration and prolonged chilling of the mother liquor affords 9.5 g. more of this material. The total of 21.5 g. consists of a mixture of epimers at the tetrahydropyranyl ether portion of the molecule.

The 2-methyl-3-ethyl-4-hydroxy-4-(p-tetrahydropyranyloxyphenyl)cyclohexanecarboxylic acid may be separated into its individual epimers by fractional crystallization between acetone and ethyl acetate. There is thus obtained an isomer, arbitrarily called I, which melts at 184°–185°C. after recrystallization from acetone, and an isomer called II, which melts at 194°–195°C. after recrystallization from ethyl acetate.

Anal: Calcd. for $C_{21}H_{30}O_5$: C, 69.58; H, 8.34. (I) Found: C, 68.99; H, 8.52. (II) Found: C, 68.81; H, 8.43.

λλmax. (I:KBr): 2.82, 5.90, 8.04, 8.30, 8.46, 8.84, 8.99, 9.60, 9.72, 10.35, 10.82, 11.43, 11.98$\mu$.

λλmax. (II:KBr): 2.90, 5.88, 8.10, 8.28, 8.41, 9.00, 9.28, 9.70, 11.03, 11.80, 11.89, 12.00$\mu$.

Each of these isomers yields the same phenolic hydroxyacid when depyranylated with aqueous methanolic dilute acid according to the process of Example III.

Saponification, according to this example, of the crystalline C-lactone described in Example I affords the same hydroxyacid epimer mixture which is described above as having been obtained from the non-volatile crude Grignard reaction product.

EXAMPLE III

2-Methyl-3-ethyl-4-hydroxy-4-(p-hydroxyphenyl)cyclohexanecarboxylic Acid

A mixture of 13.8 g. of the tetrahydropyranyl hydroxyacid (crystalline epimer mixture) of Example II, 350 ml. of methanol, 45 ml. of water and 2.0 ml. of 12.5 N. hydrochloric acid is stirred at 20°–25°C. for 40 minutes. Five ml. of pyridine and 350 ml. of water are added to the resulting clear solution and it is evaporated under vacuum to a volume of 300 ml. to remove methanol and dihydropyran. To the residue of water and viscous oil is added 35 ml. of 4 N. hydrochloric acid and the mixture is extracted with two 200 ml. portions of ether. The combined ether solution is washed twice with water, dried with anhydrous magnesium sulfate, and evaporated under vacuum to a viscous oil. The latter is dissolved in 40 ml. of methylene dichloride and this solution is stored at 0°C. to afford 7.5 g. of crystalline 2-methyl-3-ethyl-4-hydroxy-4-(p-hydroxyphenyl)cyclohexanecarboxylic acid, m.p. 219°–222°C. Recrystallization from acetone plus methylene dichloride affords the phenolic hydroxyacid as dense white granules which melt at 222°–224°C.

As noted in Example II, similar depyranylation of the individual epimers, I and II, yields hydroxyacid identical with that just described.

Anal: Calcd. for $C_{16}H_{22}O_4$: C, 69.04; H, 7.97. Found: C, 68.46; H, 8.05.

λλmax. (KBr): 2.78, 3.06, 5.86, 8.07, 8.29, 8.63, 9.11, 10.31, 10.98, 11.58, 11.90, 12.00$\mu$.

EXAMPLE IV

2-Methyl-3-ethyl-4-hydroxy-4-(p-acetoxyphenyl)cyclohexanecarboxylic Acid

To a solution of 6.0 g. of 2-methyl-3-ethyl-4-hydroxy-4-(p-hydroxyphenyl)cyclohexanecarboxylic acid (Example III) in 75 ml. of pyridine is added 15 ml. of acetic anhydride. The mixture is maintained at 25°C. for 15 minutes and the acetylation mixture is then hydrolyzed in ice and water. The oily product is extracted with two 75 ml. portions of ether. The combined ether solution is washed with cold 5% hydrochloric acid to remove pyridine, and it is dried with anhydrous magnesium sulfate and evaporated to a tacky crystalline residue which is recrystallized from acetone plus hexane to afford 5.6 g. of 2-methyl-3-ethyl-4-hydroxy-4-(p-acetoxyphenyl)cyclohexanecarboxylic acid as white prisms which melt at 199°–201°C.

Anal: Calcd. for $C_{18}H_{24}O_5$: C, 67.48; H, 7.55. Found: C, 67.39; H, 7.67.

λλmax. (KBr): 2.79, 5.71, 5.89, 8.17, 8.30, 10.89, 11.70$\mu$.

EXAMPLE V

Anhydride of 2-Methyl-3-ethyl-4-hydroxy-4-(p-acetoxyphenyl)cyclohexanecarboxylic Acid To a rapidly stirred suspension of 4.7 g. of 2-methyl-3-ethyl-4-hydroxy-4-(p-hydroxyphenyl)cyclohexanecarboxylic acid (Example III) in 40 ml. of acetic anhydride is added 2 ml. of pyridine. After 5 minutes at 25°C., the resulting clear solution is poured into an ice and water mixture and vigorous stirring is maintained for 10 minutes to effect hydrolysis of the excess acetic anhydride. The white crystalline solid which is formed is filtered off, washed well with water on the filter funnel, and is dried under vacuum to afford 5.2 g. of white prisms which melt at 105°–110°C. Recrystallization from ether gives a material which melts at 112°–114°C.

The infrared spectrum identifies this as the carboxylic acid anhydride of 2-methyl-3-ethyl-4-hydroxy-4-(p-acetoxyphenyl)-cyclohexanecarboxylic acid, monoacetic acid (solvate).

Anal: Calcd. for $C_{38}H_{50}O_{11}$: C, 66.86; H, 7.34. Found: C, 66.96; H, 7.40.

λλmax. (KBr): 2.83, 5.50, 5.77, 8.12, 8.37, 8.57, 9.22, 10.00, 10.21, 10.89, 11.79, 12.42$\mu$.

EXAMPLE VI

Methyl 2-Methyl-3-ethyl-4-hydroxy-4-(p-tetrahydropyranyloxyphenyl)cyclohexanecarboxylate A mixture of 4.0 g. of crystalline C-lactone of 2-methyl-3-ethyl-4-hydroxy-4-(p-tetrahydropyranyloxyphenyl)cyclohexanecarboxylic acid (Example I), 2.0 g. of sodium hydroxide, 20 ml. of methanol and 20 ml. of water is stirred and boiled under reflux for 1 hour to effect saponification of the lactone. The clear aqueous methanolic solution is diluted with 130 ml. of dimethylformamide and is evaporated under vacuum to a volume of 65 ml., thus removing all methanol and water. To the residual dimethylformamide solution is added 4.7 ml. of dimethyl sulfate and this mixture is shaken at 25°C. for 10 minutes and is again evaporated under vacuum to remove most of the remaining dimethylformamide. The pasty residue is shaken with ether plus water, the layers are separated, and the ether solution is washed with cold 2% aqueous sodium hydroxide. It is dried with anhydrous magnesium sulfate and evaporated to afford 4.7 g. of white, crystalline methyl 2-methyl-3-ethyl-4-hydroxy-4-(p-tetrahydropyranyloxyphenyl)cyclohexanecarboxylate, of m.p. 120°–127°C.

Anal: Calcd. for $C_{22}H_{32}O_5$: C, 70.18; H, 8.57. Found: C, 70.37; H, 8.51.

λλmax. (KBr): 2.83, 5.81, 8.03, 8.29, 8.47, 8.99, 9.60, 10.30, 10.81, 11.42, 11.98µ.

EXAMPLE VII

Methyl 2-Methyl-3-ethyl-4-hydroxy-4-(p-hydroxyphenyl)cyclohexanecarboxylate

A mixture of 4.0 g. of methyl 2-methyl-3-ethyl-4-hydroxy-4-(p-tetrahydropyranyloxyphenyl)cyclohexanecarboxylate (Example VI), 20 ml. of methanol and 2 ml. of water containing four drops of 12.5 N. hydrochloric acid is stirred at 25°C. for 20 minutes. To the resulting clear solution is added 120 ml. of water and 1.0 ml. of pyridine and this mixture is extracted with three 60 ml. portions of ether. The combined ether solution is washed with cold 2% hydrochloric acid, and then water, followed by 10% aqueous potassium bicarbonate. The ether solution is dried with anhydrous magnesium sulfate, and is evaporated to afford 2.5 g. of methyl 2-methyl-3-ethyl-4-hydroxy-4-(p-hydroxyphenyl)cyclohexanecarboxylate as an amorphous glass.

Anal: Calcd. for $C_{17}H_{24}O_4$: C, 69.83; H, 8.28. Found: C, 69.28; H, 8.38.

λλmax. (Neat): 2.90, 5.82, 8.25, 8.58, 9.63, 9.82, 12.00µ.

EXAMPLE VIII

Methyl 2-Methyl-3-ethyl-4-hydroxy-4-(p-acetoxyphenyl)cyclohexanecarboxylate

A. 2.5 g. of methyl 2-methyl-3-ethyl-4-hydroxy-4-(p-hydroxyphenyl)cyclohexanecarboxylate (Example VII) is acetylated for 20 minutes at 25°C. in a mixture of 15 ml. of pyridine plus 15 ml. of acetic anhydride. Hydrolysis of the acetylation solution in ice and water affords a viscous oily product which becomes crystalline on maintaining the hydrolysis mixture at 0°C. for 20 hours. This solid is filtered off with suction and is dried thoroughly in air and is recrystallized from ether to afford methyl 2-methyl-3-ethyl-4-hydroxy-4-(p-acetoxyphenyl)cyclohexanecarboxylate, white prisms which melt at 118°–119°C.

Anal: Calcd. for $C_{19}H_{26}O_5$: C, 68.24; H, 7.84. Found: C, 68.31; H, 7.80.

λλmax. (KBr): 2.87, 5.71, 5.82, 8.10-8.30, 8.65, 9.61, 9.80, 10.91, 11.80µ.

B. The anhydride of 2-methyl-3-ethyl-4-hydroxy-4-(p-acetoxyphenyl)cyclohexanecarboxylic acid (Example V) is boiled under reflux in pyridine plus methanol for 30 minutes to yield a mixture of products from which there is isolated methyl 2-methyl-3-ethyl-4-hydroxy-4-(p-acetoxyphenyl)cyclohexanecarboxylate, m.p. 118°–119°C.

Other products are 2-methyl-3-ethyl-4-hydroxy-4-(p-acetoxyphenyl)cyclohexanecarboxylic acid (Example IV) and 2-methyl-3-ethyl-4-hydroxy-4-(p-hydroxyphenyl)cyclohexanecarboxylic acid (Example III).

EXAMPLE IX

2-Methyl-3-ethyl-4-(p-hydroxyphenyl)-4-cyclohexenecarboxylic Acid

A. To a vigorously stirred suspension of 6.0 g. of 2-methyl-3-ethyl-4-hydroxy-4-(p-hydroxyphenyl)cyclohexanecarboxylic acid (Example III) in 100 ml. of ether is added 4.0 ml. of boron trifluoride etherate. After 4 minutes of stirring at 25°C., the solid has completely dissolved and at this point 75 g. of ice plus water is added. Vigorous shaking destroys the catalyst and the layers are separated. The ether solution is washed twice more with small portions of water and is dried with anhydrous magnesium sulfate and evaporated under vacuum to a glassy residue. The residue is dissolved in 45 ml. of warm methylene dichloride, and a few drops of water are added. The mixture is stirred for several hours at 25°C. to afford 3.4 g. of fine anhydrous granules of 2-methyl-3-ethyl-4-(p-hydroxyphenyl)-4-cyclohexenecarboxylic acid which melts at 193°–195°C. A second recrystallization affords material of m.p. 197°–199°C.

The infrared spectrum, in a potassium bromide wafer, is unusual for this structure. Apparently, this material exists as a crystal lattice dimer as crystallized from methylene chloride in the presence of water. It may be sublimed under vacuum without chemical change, but the sublimate is observed to be an amorphous glass which, upon heating, is transformed to the crystalline form which melts at 197°–199°C. and which exhibits the infrared spectral properties noted below. Proton magnetic resonance shows one vinyl hydrogen.

Recrystallization from nitromethane gives a different allotropic form with a somewhat altered infrared spectrum. However, this is converted (upon heating) to the form described.

Anal: Calcd. for $C_{16}H_{20}O_3$: C, 73.82; H, 7.74. Found: C, 73.87; H, 7.87.

λλmax. (KBr): From $CH_2Cl_2 + H_2O$: 3.00, 5.88, 8.11, 8.75, 11.79, 12.08, 14.20, 14.90µ. From $CH_3NO_2$: 2.95, 5.88, 8.10, 8.50, 11.60-11.70, 13.80µ.

Acetylation of this Δ⁴-acid with acetic anhydride in the presence of a large amount of pyridine affords a high yield of 2-methyl-3-ethyl-4-(p-acetoxyphenyl)-4-cyclohexenecarboxylic acid, identical with that obtained in Example XIII.

B. A mixture of 0.4 g. of 2-methyl-3-ethyl-4-(p-acetoxyphenyl)-4-cyclohexenecarboxylic acid (Example XIII), 1.2 g. of potassium bicarbonate and 25 ml. of water is stirred and boiled under reflux for 10 minutes. After cooling, the bicarbonate solution is acidified with dilute hydrochloric acid and is extracted with two 20 ml. portions of ether. The combined ether solution is dried with anhydrous magnesium sulfate and is evaporated under vacuum to a glassy residue which is recrystallized twice from methylene dichloride in the presence of water, as described in A, to afford 0.25 g. of fine white granules which melt at 194°–197°C. and which are spectrally identical with the Δ⁴-acid described in A.

C. A mixture of 3.0 g. of the anhydride of 2-methyl-3-ethyl-4-hydroxy-4-(p-acetoxyphenyl)cyclohexanecarboxylic acid (Example V), 0.6 g. of p-toluenesulfonic acid monohydrate, 7.0 ml. of acetic anhydride and 100 ml. of acetic acid is boiled under reflux for 10 minutes and the resulting solution is evaporated under vacuum. The oily residue is dissolved in 100 ml. of ether and washed with water to remove the sulfonic acid. The ether solution is evaporated to a viscous oil. The latter, which is essentially dehydrated anhydride, is hydrolyzed by stirring and boiling under reflux with a solution of 6.0 g. of potassium bicarbonate in 100 ml. of water and 4 ml. of tetrahydrofuran for a period of 8 hours. The hydrolysis mixture is filtered to clarify and it is then acidified with dilute hydrochloric acid and extracted twice with ether. Crystallization of the glassy ether residue in the manner described in A affords 1.2 g. of 2-methyl-3-ethyl-4-(p-hydroxyphenyl)-4-cyclohexenecarboxylic acid, identical with the material described in A and B.

D. A solution of 0.1 g. of the C-lactone of 2-methyl-3-ethyl-4-hydroxy-4-(p-hydroxyphenyl)cyclohexanecarboxylic acid (Example XV) and 0.2 g. of sodium hydroxide in 2 ml. of water and 2 ml. of methanol is boiled under reflux for 75 minutes. Ten ml. of water is added to the alkaline solution and it is evaporated to a volume of 8 ml. to remove methanol and it is then cooled and acidified with dilute hydrochloric acid. The oil thus precipitated is extracted with ether. Drying and evaporation of the ether solution affords a glassy residue which is dissolved in 5 ml. of nitromethane and re-evaporated to remove all traces of ether. The oil is now redissolved in 5 ml. of nitromethane and stored at 0°C. to afford 0.03 g. of white microprisms of 2-methyl-3-ethyl-4-(p-hydroxyphenyl)-4-cyclohexenecarboxylic acid which has an infrared spectrum (KBr) identical with the material described in A, as crystallized from nitromethane.

EXAMPLE X

Sodium Salt of 2-methyl-3-ethyl-4-(p-hydroxyphenyl)-4-cyclohexenecarboxylic Acid To a solution of 0.5 g. of 2-methyl-3-ethyl-4-(p-hydroxyphenyl)-4-cyclohexenecarboxylic acid (Example IX) in 12 ml. of methanol is added 0.2 g. of sodium bicarbonate and 20 ml. of water. The mixture is stirred at 45°C. for 10 minutes and is concentrated under vacuum to a solid residue. The latter is thoroughly mixed with 15 ml. of methanol and the mixture is filtered to remove a small amount of sodium bicarbonate. The clear filtrate is evaporated to dryness and the solid residue is pulverized and dried over phosphoric anhydride to afford the sodium salt of 2-methyl-3-ethyl-4-(p-hydroxyphenyl)-4-cyclohexenecarboxylic acid as a fluffy, white, non-hygroscopic powder which readily dissolves in water.

λλmax. (KBr): 2.92, 6.45, 6.60, 7.07, 7.95, 8.08, 8.50, 9.08, 12.02μ.

EXAMPLE XI

2-Methyl-3-ethyl-4-(p-hydroxyphenyl)-3-cyclohexenecarboxylic Acid

A. A mixture of 2.0 g. of 2-methyl-3-ethyl-4-hydroxy-4-(p-hydroxyphenyl)cyclohexanecarboxylic acid (Example III), 0.6 g. of p-toluenesulfonic acid monohydrate and 100 ml. of acetic acid is boiled under reflux for 40 minutes and the solution is evaporated under vacuum to a glassy residue. The latter is dissolved in 70 ml. of 4% aqueous sodium hydroxide and this solution is neutralized by bubbling through it a vigorous stream of carbon dioxide until it reacts neutral to test paper. Extraction of this neutral aqueous solution with two small portions of methylene dichloride removes 0.3 g. of lactonic material which is purified in the manner described in Example XVI.

The aqueous solution is acidified with dilute hydrochloric acid and is extracted with three 20 ml. portions of methylene dichloride. The combined extracts are dried with anhydrous magnesium sulfate and evaporated under vacuum to an amorphous glass. The latter is redissolved in 15 ml. of methylene dichloride and stored at 0°C. to afford 0.8 g. of 2-methyl-3-ethyl-4-(p-hydroxyphenyl)-3-cyclohexenecarboxylic acid as white microprisms. This material apparently exists in several polymorphic forms depending upon the speed and mode of crystallization. Very slow crystallization from methylene dichloride in the presence of a few drops of water affords fine anhydrous prisms which melt at 147°–148°C. Proton magnetic resonance shows no vinyl hydrogen.

Anal: Calcd. for $C_{16}H_{20}O_3$: C, 73.82; H, 7.74. Found: C, 73.70; H, 7.96.

λλmax. (KBr): 2.92, 5.88, 8.08, 8.51, 8.71, 9.04, 11.41, 12.08μ.

B. A mixture of 0.8 g. of 2-methyl-3-ethyl-4-(p-acetoxyphenyl)-3-cyclohexenecarboxylic acid (Example XII), 3.0 g. of potassium bicarbonate and 60 ml. of water is stirred and boiled under reflux for 10 minutes. After cooling, the bicarbonate solution is acidified with dilute hydrochloric acid and is extracted with two 40 ml. portions of ether. The combined ether solution is dried with anhydrous magnesium sulfate and is evaporated under vacuum to a glassy residue which is recrystallized from methylene dichloride in the presence of water, as described in A, to afford 0.6 g. of white microprisms which melt at 145°–147°C., and which are spectrally identical with the Δ³-acid as isolated in A.

EXAMPLE XII

Sodium Salt of 2-methyl-3-ethyl-4-(p-hydroxyphenyl)-3-cyclohexenecarboxylic Acid Following the procedure of Example X, 0.35 g. of 2-methyl-3-ethyl-4-(p-hydroxyphenyl)-3-cyclohexenecarboxylic acid (Example XI) is neutralized in aqueous methanol with 0.15 g. of sodium bicarbonate. Identical working-up affords the sodium salt of the carboxylic acid as a fluffy, white, non-hygroscopic powder which readily dissolves in water.

λλmax. (KBr): 2.92, 6.45, 6.60, 7.07, 7.95, 8.08, 8.52, 8.75, 9.09, 11.32, 12.04μ.

EXAMPLE XIII

2-Methyl-3-ethyl-4-(p-acetoxyphenyl)-4-cyclohexenecarboxylic Acid

A mixture of 3.9 g. of 2-methyl-3-ethyl-4-hydroxy-4-(p-acetoxyphenyl)cyclohexanecarboxylic acid (Example IV) and 200 ml. of acetic acid is rapidly brought to the boil and 1.0 g. of p-toluenesulfonic acid monohydrate is added in one portion. After a 5-minute period of boiling under reflux, the acetic acid solution is treated with 2.0 g. of sodium acetate to neutralize the toluenesulfonic acid. The mixture is evaporated under vacuum to remove acetic acid and the pasty residue is shaken with 200 ml. of ether and 50 ml. of water. The ether layer is dried with anhydrous magnesium sulfate and concentrated under vacuum to a tacky crystalline residue. The latter is recrystallized twice from ether plus hexane to afford 2.1 g. of 2-methyl-3-ethyl-4-(p-acetoxyphenyl)-4-cyclohexenecarboxylic acid, white prisms which melt at 154°–155°C. Proton magnetic resonance shows one vinyl proton in this compound.

Anal: Calcd. for $C_{18}H_{22}O_4$: C, 71.50; H, 7.33. Found: C, 71.25; H, 7.58.

λλmax. (KBr): 5.69, 5.91, 8.19, 8.30, 9.75, 10.90, 11.73, 11.90μ.

EXAMPLE XIV

2-Methyl-3-ethyl-4-(p-acetoxyphenyl)-3-cyclohexenecarboxylic Acid

A mixture of 1.0 g. of 2-methyl-3-ethyl-4-hydroxy-4-(p-hydroxyphenyl)cyclohexanecarboxylic acid (Example III), 0.3 g. of p-toluenesulfonic acid and 50 ml. of acetic acid is boiled under reflux for 30 minutes and is evaporated under vacuum to remove acetic acid. The glassy residue is dissolved in 20 ml. of pyridine and 3 ml. of acetic anhydride is added. After it has been kept at 25°C. for 20 minutes, the acetylation mixture is hydrolyzed in ice water and the oily product is extracted with two 50 ml. portions of ether. The combined ether solution is chilled to 0°C. and is quickly extracted with two ice-cold 40 ml. portions of 7% aqueous potassium carbonate to separate carboxylic acid from the by-product lactone which is also formed on dehydration. The potassium carbonate extracts are immediately acidified with cold dilute hydrochloric acid and then extracted with two 35 ml. portions of ether. The combined ether solution is washed twice with water, dried with anhydrous magnesium sulfate and evaporated under vacuum to a crystalline residue which is recrystallized twice from ether plus hexane to afford 0.65 g. of 2-methyl-3-ethyl-4-(p-acetoxyphenyl)-3-cyclohexenecarboxylic acid, white prisms which melt at 145°–147°C. Proton magnetic resonance shows no vinyl hydrogen.

Anal: Calcd. for $C_{18}H_{22}O_4$: C, 71.50; H, 7.33. Found: C, 71.66; H, 7.29.

λλmax. (KBr): 5.69, 5.88, 8.22, 8.37, 9.74, 9.85, 10.92, 11.41, 11.77μ.

B. Example IX-C describes the dehydration of 3.0 g. of the anhydride of 2-methyl-3-ethyl-4-hydroxy-(p-acetoxyphenyl)cyclohexanecarboxylic acid and the subsequent isolation of 2-methyl-3-ethyl-4-(p-hydroxyphenyl)-4-cyclohexenecarboxylic acid.

The methylene dichloride mother liquor from recrystallization of the latter is evaporated to a glassy residue which is then boiled under reflux for 30 minutes in 50 ml. of acetic acid containing 0.3 g. of p-toluenesulfonic acid monohydrate. The acetic acid solution is evaporated under vacuum to a viscous oil which is dissolved in 20 ml. of pyridine containing 3 ml. of acetic anhydride. After it has been held at 25°C. for 20 minutes, the acetylation mixture is hydrolyzed in ice and water and the oily product is extracted with ether. Washing of the ether solution with cold dilute hydrochloric acid removes pyridine, and the acidic reaction products are extracted by washing twice with cold 7% potassium carbonate solutions. The ether solution, which contains only lactones, is reserved for use in Example XVIII. The combined carbonate washes are immediately acidified with hydrochloric acid and the oily carboxylic acid is extracted with ether. The residue from evaporation of this ether solution is recrystallized from ether-hexane to afford 0.65 g. of 2-methyl-3-ethyl-4-(p-acetoxyphenyl)-3-cyclohexenecarboxylic acid, cream prisms which melt at 140°–145°C., whose infrared spectrum is identical with that of the material described in A.

EXAMPLE XV

C-Lactone of 2-Methyl-3-ethyl-4-hydroxy-4-(p-hydroxyphenyl)cyclohexanecarboxylic Acid, and C-Lactone of 2-Methyl-3-ethyl-4-hydroxy-4-(p-acetoxyphenyl)cyclohexanecarboxylic Acid A. A mixture of 0.3 g. of crystalline C-lactone of 2-methyl-3-ethyl-4-hydroxy-4-(p-tetrahydropyranyloxyphenyl)cyclohexanecarboxylic acid (Example I), 7 ml. of methanol and 1 ml. of water containing two drops of 12.5 N. hydrochloric acid is stirred at 25°C. for 15 minutes. The resulting clear solution is diluted with 75 ml. of water and extracted with two 25 ml. portions of ether. The combined ether solution is washed with water and 5% aqueous sodium bicarbonate and is dried with anhydrous magnesium sulfate and evaporated under vacuum to a pasty solid residue. The latter is recrystallized from ether plus hexane to afford 0.2 g. of the C-lactone of 2-methyl-3-ethyl-4-hydroxy-4-(p-hydroxyphenyl)cyclohexanecarboxylic acid as fine white granules which melt at 158°–159°C.

Anal: Calcd. for $C_{16}H_{20}O_3$: C, 73.82; H, 7.74. Found: C, 73.89; H, 7.93.

λλmax. (KBr): 2.95, 5.80, 7.88, 8.18, 9.11, 9.85, 11.99μ.

B. Acetylation of 0.1 g. of the hydroxyphenyl lactone described in A with acetic anhydride in pyridine for twenty minutes at 25°C., followed by conventional hydrolysis and workup of the reaction mixture affords 0.1 g. of the corresponding acetoxyphenyl C-lactone as a viscous oil having a boiling point of 155°–160°C. at 0.01 mm. and an index of refraction $n_D^{24}$ 1.5369.

Anal: Calcd. for $C_{18}H_{22}O_4$: C, 71.50; H, 7.33. Found: C, 70.98; H, 7.37.

λλmax. (Neat): 5.70, 5.18–5.36, 9.13, 9.85, 10.94, 11.78μ.

EXAMPLE XVI

Lactone of 2-Methyl-3-ethyl-4-hydroxy-4-(p-hydroxyphenyl)cyclohexanecarboxylic Acid, and B-Lactone of 2-Methyl-3-ethyl-4-hydroxy-4-(p-acetoxyphenyl)cyclohexanecarboxylic Acid A. The 0.3 g. portion of lactonic material described as a by-product in Example XI had been obtained as a crystalline residue from methylene dichloride extraction of an aqueous bicarbonate solution of products from strong acid dehydration of 2-methyl-3-ethyl-4-hydroxy-4-(p-hydroxyphenyl)cyclohexanecarboxylic acid. This 0.3 g. of lactone is recrystallized from ether to afford 0.2 g. of white prisms which melt at 184°–185°C. According to its infrared spectrum, it is of a different stereochemical series from the C-lactone (Example XV) and it is now designated a B-lactone of 2-methyl-3-ethyl-4-hydroxy-4-(p-hydroxyphenyl)cyclohexanecarboxylic acid.

Anal: Calcd. for $C_{16}H_{20}O_3$: C, 73.82; H, 7.74. Found: C, 73.88; H, 7.86.

λλmax. (KBr): 2.94, 5.69, 7.94, 8.73, 9.00, 10.70, 11.99μ.

B. Acetylation of 0.1 g. of the hydroxyphenyl lactone described in A with acetic anhydride in pyridine for 20 minutes at 25°C., followed by conventional hydrolysis and workup of the reaction mixture affords 0.1 g. of a solid acetoxyphenyl B-lactone which is recrystallized from ether to afford white prisms which melt at 151°–152°C. Anal: Calcd. for $C_{18}H_{22}O_4$: C, 71.50; H, 7.33. Found: C, 71.68; H, 7.27.

λλmax. (KBr): 5.61, 8.20, 8.32, 8.39, 8.79, 10.71, 10.82, 10.95μ.

EXAMPLE XVII

A-Lactone of 2-Methyl-3-ethyl-4-hydroxy-4-(p-hydroxyphenyl)cyclohexanecarboxylic Acid, and A-Lactone of 2-Methyl-3-ethyl-4-hydroxy-4-(p-acetoxyphenyl)cyclohexanecarboxylic Acid A. The methylene dichloride-soluble material of Example II, obtained as 22 g. of viscous oil after crystallization of the hydroxy acid, is depyranylated by dissolving it in 500 ml. of methanol and 40 ml. of water containing 4 ml. of 12.5 N. hydrochloric acid. After this solution has been maintained at 25°C. for 1 hour, it is diluted with 500 ml. of water and is evaporated under vacuum to a volume of 350 ml. to remove methanol. To the residual mixture of viscous oil and water is added 60 ml. of 25% aqueous sodium hydroxide and the resulting clear solution is neutralized by bubbling through it a vigorous stream of carbon dioxide until it reacts neutral to test paper. The precipitate material, a crude lactone, is extracted with 100 ml. of methylene dichloride and this extract is dried with anhydrous magnesium sulfate and evaporated to a tacky crystalline residue. The latter is recrystallized from ether to afford 2.5 g. of white prisms which melt at 169°–170°C. According to its infrared spectrum, this is a lactone of a different stereochemical series from the C-lactone (Example XV) and the B-lactone (Example XVI). It is now designated an A-lactone of 2-methyl-3-ethyl-4-hydroxy-4-(p-hydroxyphenyl)cyclohexanecarboxylic acid.

Anal: Calcd. for $C_{16}H_{20}O_3$: C, 73.82; H, 7.74. Found: C, 73.89; H, 7.93.

λλmax. (KBr): 2.94, 5.83, 8.12, 8.32, 8.76, 9.92, 10.42, 11.68, 11.93μ.

B. Acetylation of 1.0 g. of the hydroxyphenyl lactone described in A with acetic anhydride in pyridine for 30 minutes at 25°C., followed by conventional hydrolysis and workup of the reaction affords 1.0 g. of a solid acetoxyphenyl A-lactone which is recrystallized from ether plus hexane to afford white prisms which melt at 74°–75°C.

Anal: Calcd. for $C_{18}H_{22}O_4$: C, 71.50; H, 7.33. Found: C, 71.44; H, 7.24.

λλmax. (KBr): 5.64, 5.71, 8.20-8.32, 9.03, 9.88, 10.91, 11.74μ.

EXAMPLE XVIII

D-Lactone of 2-Methyl-3-ethyl-4-hydroxy-4-(p-acetoxyphenyl)cyclohexanecarboxylic Acid A. The ether solution of Example XIV-B which has been described as containing lactones, is evaporated to afford 0.45 g. of a crystalline mixture of lactones. This is fractionally crystallized between ether and methanol, whereby there is finally obtained 0.15 g. of the B-lactone, which has infrared and proton magnetic resonance spectra identical with those of the material described in Example XVI-B. There is also obtained 0.04 g. of another lactone, different from the A, B, and C-lactones (Examples XV-B, XVI-B, and XVII-B) in its infrared and proton magnetic resonance spectra. This lactone melts at 154°–155°C., and is called the D-lactone of 2-methyl-3-ethyl-4-hydroxy-4-(p-acetoxyphenyl)cyclohexanecarboxylic acid.

Anal: Calcd. for $C_{18}H_{22}O_4$: C, 71.50; H, 7.33. Found: C, 72.22; H, 7.50.

λλmax. (KBr): 5.71, 8.27, 8.38, 9.87, 10.71, 10.97, 11.73μ.

EXAMPLE XIX

Methyl 2-Methyl-3-ethyl-4-(p-hydroxyphenyl)-4-cyclohexenecarboxylate

To a solution of 3.0 g. of methyl 2-methyl-3-ethyl-4-hydroxy-4-(p-hydroxyphenyl)cyclohexanecarboxylate (Example VII) in 75 ml. of ether is added 3 ml. of boron trifluoride etherate. The reaction mixture is maintained at 23°C. for 5 minutes and then is shaken with 20 ml. of ice and water. The ether layer is washed with aqueous sodium bicarbonate and is dried with anhydrous magnesium sulfate and evaporated under vacuum. Trituration of the tacky crystalline residue with 20 ml. of nitromethane, followed by chilling at 0°C. and filtration, affords 1.9 g. of white prisms. Recrystallization from 15 ml. of nitromethane affords 1.5 g. of methyl 2-methyl-3-ethyl-4-(p-hydroxyphenyl)-4-cyclohexenecarboxylate, white prisms which melt at 141°–142°C. Proton magnetic resonance shows the presence of one vinyl hydrogen atom.

Anal: Calcd. for $C_{17}H_{22}O_3$: C, 74.42; H, 8.08. Found C, 73.80; H, 7.92.

λλmax. (KBr): 2.89, 5.82, 7.81, 8.19, 8.59, 11.70, 11.82, 12.17, 13.03, 13.45, 13.84μ.

EXAMPLE XX
Methyl 2-Methyl-3-ethyl-4-(p-hydroxyphenyl)-3-cyclohexenecarboxylate A mixture of 3.5 g. of methyl 2-methyl-3-ethyl-4-hydroxy(p-hydroxyphenyl)cyclohexanecarboxylate (Example VII) and 0.9 g. of p-toluenesulfonic acid monohydrate in 150 ml. of acetic acid is boiled under reflux for 25 minutes and then the resulting solution is concentrated under vacuum to a viscous brown oil. The latter is dissolved in 150 ml. of ether and the solution is washed twice with aqueous potassium bicarbonate and then dried with magnesium sulfate and evaporated to a yellow oil. Distillation of this affords 3.0 g. of a viscous oil which boils at 140°–150°C. at 0.002 mm. This is dissolved in 12 ml. of nitromethane and stored at 0°C. to cause crystallization of 1.6 g. of dense clusters of prisms, which upon further recrystallization from nitromethane affords 1.5 g. of methyl 2-methyl-3-ethyl-4-(p-hydroxyphenyl)-3-cyclohexenecarboxylate, large white prisms which melt at 113°–114°C.

Proton magnetic resonance is not diagnostic for the absence of a vinyl proton in this phenolic ester because the phenol proton absorbs in the vinyl region. However, acetylation with acetic anhydride and pyridine gives an oily acetoxyphenyl methyl ester which shows no vinyl proton, thus substantiating the assignment of unsaturation to the 3–4 positions of the alicyclic portion of the molecule.

Anal: Calcd. for $C_{17}H_{22}O_3$: C, 74.42; H, 8.08. Found: C 74.20; H, 8.16.

λλmax. (KBr): 2.98, 5.88, 7.89, 8.07, 8.12, 8.53, 9.87, 11.83, 12.11μ.

While the invention has been described and exemplified with respect to the preparation of compounds wherein the cyclohexane and cyclohexene portion of the structure have 2-methyl-3-ethyl substitution, and wherein the phenyl portion of the structure has either p-hydroxy or p-acetoxy substitution, it will be apparent to one skilled in the art that other substitutions are readily available.

By selecting as one of the starting materials for use in Example I, an appropriate material such as:
ethyl 2,3-dimethyl-4-ketocyclohexanecarboxylate,
ethyl 2,3-diethyl-4-ketocyclohexanecarboxylate,
ethyl 2,3-dipropyl-4-ketocyclohexanecarboxylate,
ethyl 2-ethyl-3-methyl-4-ketocyclohexanecarboxylate,
ethyl 2-methyl-3-propyl-4-ketocyclohexanecarboxylate,
ethyl 2-ethyl-3propyl-4-ketocyclohexanecarboxylate, etc.,
the 2 and 3 positions of the cyclohexyl portion of the structure may be substituted with an alkyl of from one to eight carbon atoms.

The phenyl portion of the structure may be para-substituted with an ester of from two to nine carbon atoms by esterifying the substituted (p-hydroxyphenyl)cyclohexane carboxylic acid or carboxylate with an appropriate acid anhydride such as propionic anhydride, normal and isobutyric anhydride, caprylic anhydride, etc.

As noted earlier, the compounds of formulae 2, 3 and 4 are effective in the suppression of reproduction in female animals. In testing the compounds for antilittering activity, an experimental group of animals such as rats, rabbits, or mice, for example, is fed a basic diet containing the compound to be tested for a period of 7 days. For the purpose of illustration, adult rats will be employed as the test animals. After receiving the basic diet, the rats are then cohabitated at a ratio of two males to five females and allowed to copulate freely for a period of 15 days during which time they are fed the basic diet containing the test compound. The sexes are then segregated and the basic diet only continued. A control group of animals is treated identically except that the basic diet does not contain the compound to be tested. The females are observed for littering for a 21-day period following the period of cohabitation.

The minimum daily dose required to prevent littering in the test animals for various compounds tested is tabulated below:

TABLE I

| Compound | Antilittering Activity (oral) (dose wgt./kg.; Rat) | |
|---|---|---|
| 2-methyl-3-ethyl-4-hydroxy-4-(p-tetrahydropyranyloxyphenyl)-cyclohexanecarboxylic acid (Example II. p. 8) | (I) 5 mg.<br>(II) 2.5 mg. | (5000 μg.)<br>(2500 μg.) |
| 2-methyl-3-ethyl-4-hydroxy-4-(p-hydroxyphenyl) cyclohexanecarboxylic acid (Example III, p. 10) | 1.0 mg. | (1000 μg.) |
| 2-methyl-3-ethyl-4-hydroxy-4-(p-acetoxyphenyl) cyclohexanecarboxylic acid (Example IV, p. 11) | 1.0 mg. | (1000 μg.) |
| 2-methyl-3-ethyl-4-(p-hydroxyphenyl)-4-cyclohexenecarboxylic acid (Example IX, p. 15) | 0.005 mg. | (5 μg.) |
| 2-methyl-3-ethyl-4-(p-hydroxyphenyl)-3-cyclohexenecarboxylic acid (Example XI, p. 18–20) | 0.001 mg. | (1 μg.) |
| 2-methyl-3-ethyl-4-(p-acetoxyphenyl)-4-cyclohexenecarboxylic acid (Example XIII, p. 20–21) | 0.005 mg. | (5 μg.) |
| methyl 2-methyl-3-ethyl-4-(p-hydroxyphenyl)-4-cyclohexenecarboxylate (Example XIX, p. 27) | 0.010 mg. | (10 μg.) |
| methyl 2-methyl-3-ethyl-4-(p-hydroxyphenyl)-3-cyclohexenecarboxylate (Example XX, p. 27–28) | 0.001 mg. | (1 μg.) |

The data in the following table demonstrate the antilittering effect in rats of various compounds:

TABLE II

| Compound | Dose wgt./kg. | % Littering | Number Litters/Total |
|---|---|---|---|
| 2-methyl-3-ethyl-4-(p-hydroxyphenyl)-4-cyclohexenecarboxylic acid | 0.005 mg. | 0 | 0/10 |
| Control | 0 | 80 | 8/10 |

TABLE II — Continued

| Compound | Dose wgt./kg. | % Littering | Number Litters/Total |
|---|---|---|---|
| 2-methyl-3-ethyl-4-(p-hydroxyphenyl)-3-cyclohexenecarboxylic acid | 0.001 mg. | 0 | 0/10 |
| Control | 0 | 90 | 9/10 |
| 2-methyl-3-ethyl-4-(p-acetoxyphenyl)-4-cyclohexenecarboxylic acid | 0.005 mg. | 0 | 0/10 |
| Control | 0 | 80 | 8/10 |
| methyl 2-methyl-3-ethyl-4-(p-hydroxyphenyl)-4-cyclohexenecarboxylate | 0.010 mg. | 0 | 0/9 |
| Control | 0 | 90 | 9/10 |
| methyl 2-methyl-3-ethyl-4-(p-hydroxyphenyl)-3-cyclohexenecarboxylate | 0.001 mg. | 10 | 1/10 |
| Control | 0 | 90 | 9/10 |

The post-coital activity of the compounds was determined using adult rats and rabbits as the test animals. Adult Wistar rats and New Zealand rabbits were used in the test. Rats exhibiting sperm on the morning of estrus were used in the test. Receptive does were allowed a single mating with each of two bucks and were used in the test. The compounds were administered orally by means of a stomach tube needle on the morning of sperm and the following day to rats, and on the day of mating and the following 3 days to rabbits. Each compound was prepared by first dissolving it in ether, followed by the addition of sesame oil. Gentle warm air was used to evaporate the ether and appropriate dilutions made with sesame oil for each test group. Rats were sacrificed on day 9 of pregnancy and examined for implants. Rabbits were examined for implants on day 20 of pregnancy. The results are shown in Tables III and IV.

TABLE III

| No. Rats | Compound | Dose (μg/kg) | Day(s) of Pregnancy Treated | Preg./Total | Total No. Implants | Comments |
|---|---|---|---|---|---|---|
| 5 | Control | 0 | 1,2 | 5/5 | 69 | All normal |
| 5 | 2-methyl-3-ethyl-4-(p-hydroxyphenyl)-3-cyclohexenecarboxylic acid | 5 | 1,2 | 2/5 | 10(1,9) | All resorbing |
| 5 | 2-methyl-3-ethyl-4-(p-hydroxyphenyl)-4-cyclohexenecarboxylic acid | 10 | 1,2 | 2/5 | 2 | Resorbing |

TABLE IV

| No. Rabbits | Compound | Dose μg/kg) | Day(s) of Pregnancy Treated | Preg./Total | Number of Implants | | |
|---|---|---|---|---|---|---|---|
| | | | | | Total | Normal | Resorbing |
| 5 | Control | 0 | 0–3 | 5/5 | 36 | 32 | 4 |
| 9 | 2-methyl-3-ethyl-4-(p-hydroxyphenyl)-3-cyclohexenecarboxylic acid | 100 | 0–3 | 0/5 | 0 | 0 | 0 |
| 5 | 2-methyl-3-ethyl-4-(p-hydroxyphenyl)-4-cyclohexenecarboxylic acid | 100 | 0–3 | 1/5 | 1 | 0 | 1 |

What is claimed is:

1. A method of suppressing reproduction comprising administering orally to a female animal an effective anti-littering amount of a compound selected from the group consisting of:

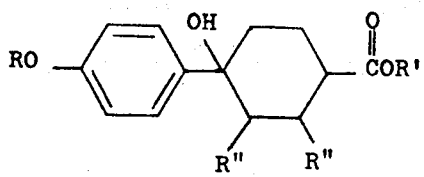 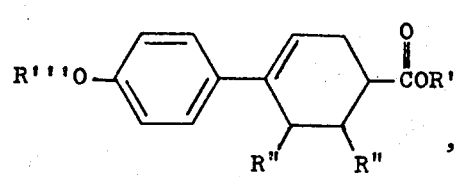

and

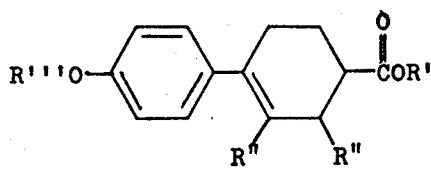

wherein R is selected from the group consisting of hydrogen, lower acyl of from two to nine carbon atoms and tetrahydropyranyl, R' is selected from the group consisting of hydrogen and lower alkyl of from one to eight carbon atoms, R'' is lower alkyl of from one to eight carbon atoms, and R''' is selected from the group consisting of hydrogen and lower acyl of from two to nine carbon atoms, or alkali metal salts thereof.

2. The method of claim 1 in which the compound is 2-methyl-3-ethyl-4-hydroxy-4-(p-tetrahydropyranyloxyphenyl) cyclohexanecarboxylic acid.

3. The method of claim 1 in which the compound is methyl 2-methyl-3-ethyl-4-hydroxy-4-(p-tetrahydropyranyloxyphenyl) cyclohexanecarboxylate.

4. The method of claim 1 in which the compound is 2-methyl-3-ethyl-4-hydroxy-4-(p-hydroxyphenyl) cyclohexanecarboxylic acid or the alkali metal salt thereof.

5. The method of claim 1 in which the compound is 2-methyl-3-ethyl-4-hydroxy-4-(p-acetoxyphenyl) cyclohexanecarboxylic acid or the alkali metal salt thereof.

6. The method of claim 1 in which the compound is methyl 2-methyl-3-ethyl-4-hydroxy-4-(p-hydroxyphenyl)cyclohexanecarboxylate.

7. The method of claim 1 in which the compound is methyl 2-methyl-3-ethyl-4-hydroxy-4-(p-acetoxyphenyl)cyclohexanecarboxylate.

8. The method of claim 1 in which the compound is 2-methyl-3-ethyl-4-(p-hydroxyphenyl)-4-cyclohexenecarboxylic acid or the alkali metal salt thereof.

9. The method of claim 1 in which the compound is 2-methyl-3-ethyl-4-(p-hydroxyphenyl)-3-cyclohexenecarboxylic acid or the alkali metal salt thereof.

10. The method of claim 1 in which the compound is 2-methyl-3-ethyl-4-(p-acetoxyphenyl)-4-cyclohexenecarboxylic acid or the alkali metal salt thereof.

11. The method of claim 1 in which the compound is 2-methyl-3-ethyl-4-(p-acetoxyphenyl)-3-cyclohexenecarboxylic acid or the alkali metal salt thereof.

12. The method of claim 1 in which the compound is methyl 2-methyl-3-ethyl-4-(p-hydroxyphenyl)-4-cyclohexenecarboxylate.

13. The method of claim 1 in which the compound is methyl 2-methyl-3-ethyl-4-(p-hydroxyphenyl)-3-cyclohexenecarboxylate.

* * * * *

UNITED STATES PATENT AND TRADEMARK OFFICE
CERTIFICATE OF CORRECTION

PATENT NO. : 3,903,292

DATED : September 2, 1975

INVENTOR(S) : George Karmas

It is certified that error appears in the above-identified patent and that said Letters Patent are hereby corrected as shown below:

In Column 5, line 61, "while a solution of 58 ethyl" should read --- while a solution of 58 g. ethyl ---.

In Column 15, line 2, "Lactone of 2-Methyl-3-ethyl-4" should read --- B-Lactone of 2-Methyl-3-ethyl-4 ---.

In Column 15, line 54, "The precipitate material" should read --- The precipitated material ---.

In Column 16, line 51, "and then is shaker" should read --- and then is shaken ---.

In Column 16, line 58, "affords 1.5g.o" should read --- affords 1.5 g. of ---.

In Column 16, line 61, "which melt a" should read --- which melt at ---.

Signed and Sealed this twenty-fourth Day of February 1976

[SEAL]

Attest:

RUTH C. MASON
Attesting Officer

C. MARSHALL DANN
Commissioner of Patents and Trademarks